United States Patent
Malnati et al.

(10) Patent No.: US 9,678,744 B2
(45) Date of Patent: Jun. 13, 2017

(54) AUTOMATED CODE PARSER FOR REVIEWING AUTOMATION SCRIPTS

(71) Applicants: James R. Malnati, Stillwater, MN (US); Robert J Jamieson, Kuala Lumpur (MY); Melanie A Wolbeck, Roseville, MN (US); Elizabeth F Roush, Roseville, MN (US)

(72) Inventors: James R. Malnati, Stillwater, MN (US); Robert J Jamieson, Kuala Lumpur (MY); Melanie A Wolbeck, Roseville, MN (US); Elizabeth F Roush, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 263 days.

(21) Appl. No.: 14/314,067

(22) Filed: Jun. 25, 2014

(65) Prior Publication Data

US 2015/0378687 A1    Dec. 31, 2015

(51) Int. Cl.
*G06F 13/00* (2006.01)
*G06F 9/44* (2006.01)

(52) U.S. Cl.
CPC .................................. *G06F 8/70* (2013.01)

(58) Field of Classification Search
CPC ....... G06F 9/45512; G06F 9/542; G06F 9/546
USPC ........................................ 719/313, 318, 320
See application file for complete search history.

(56) References Cited

U.S. PATENT DOCUMENTS 6,772,417 B1 *  8/2004  Ko ..................... H04L 43/0817
                                                        709/220
9,141,385 B2 *  9/2015  Walters ..................... G06F 9/00

* cited by examiner

*Primary Examiner* — Andy Ho
(74) *Attorney, Agent, or Firm* — Robert P. Marley; Richard J. Gregson

(57) ABSTRACT

Automation scripts may be examined and compared to a set of new or changed operating system messages to identify potential issues with the automation script that occur with updates to the operating system. When the issue is identified, the reference in the automation script may be updated to refer to the changed operating system message. Further, the reference in the automation script may be modified to address other changes in the system messages, such as changes in information and/or parameters reported in the message.

19 Claims, 5 Drawing Sheets

AUTOMATED CODE PARSER FOR REVIEWING AUTOMATION SCRIPTS

FIELD OF THE DISCLOSURE

The instant disclosure relates to automation rules for monitoring systems. More specifically, this disclosure relates to automatically updating automation rules.

BACKGROUND

Computer networks, and computer servers within the networks, have become backbones of companies throughout the world. Even if a company does not provide products or services over the internet, computer networks within the company improve employee productivity by providing employees with instantaneous access to millions of bytes of data. In fact, many companies are unable to function when the company's computer network fails. Thus, it is imperative that companies have reliable computer networks with 99.999% up time.

One conventional solution to improving the uptime of computer servers is to automate response to operating system messages. An operating system executing on a computing system may generate informational, warning, and/or error messages during operation of the computer. The system messages may contain information about an error that is or has occurred on the computing system. The system messages may also contain information about events occurring that may suggest an error is about to occur. Responding to these system messages allows computer downtime to be reduced by taking action to correct or avert errors.

A scripting system may allow automation of response to the system messages. That is, an administrator, rather than manually monitoring the computing system 24/7, may write scripts that perform certain actions in response to certain system messages and/or certain combinations of system messages. One example of this scripting is the UNISYS Autoaction Message System (AMS). These scripts improve computing system uptime by allowing template responses to certain events to resolve problems without an administrator's input.

However, the operating system messages may change as the operating system is updated over time. The changing of system messages may require an update to the scripts. For example, the scripts may refer to an operating system message that has changed or been deleted with an operating system update.

In one conventional solution, an administrator may manually examine existing scripts and the list of new or changed operating system messages to identify issues in the scripts before they were encountered in production. An individual skilled in the scripting syntax needed to be made aware of the changed operating system messages and would spend time looking through the automation scripts for potential issues. This was time-consuming, not guaranteed to expose all issues, and required the time of highly-skilled support personnel. Because there may be many of these scripts, updating the scripts may take a large amount of administrator time. Further, during the time between the change of the system messages and the updating of the scripts the computing system may experience an error that is no longer handled by the scripts. This may cause unanticipated downtime in the computing system.

SUMMARY

The automation scripts may be examined and compared to a set of new or changed operating system messages to identify potential issues. One potential issue that may be identified is a reference, in an automation script, to an operating system message that has changed. When the issue is identified, the reference in the automation script may be updated to refer to the changed operating system message. Further, the reference in the automation script may be modified to address other changes in the system messages, such as changes in information and/or parameters reported in the message.

The automation scripts may be examined in different states. For example, either compiled or uncompiled automation scripts may be examined for matches to changed operating system messages. If compiled scripts are examined, then the scripts may be decompiled to obtain the automation rules. If uncompiled automation scripts are examined, then the scripts may be structured to format the automation rules for examination. In one embodiment, the uncompiled automation scripts may be built and then decompiled to obtain a structured set of automation rules for examination.

The examination of automation scripts as described above may be used to identify issues in the automation rules that occur due to changes or additions to the operating system message definitions. The examination of automation scripts may also reveal other issues, such as a failure to comply with a best practices for automation scripts. Identifying these best practices failures may allow the automation script to be rewritten to improve efficiency of the automation script. Further, the formatting of the automation script may be improved during examination to improve readability.

During examination, the automation scripts may be executed in a simulator to identify issues in the automation rules, either syntactical or logical. Syntactical errors may cause errors in the execution of an automation script due to, for example, incorrect definitions within the automation script. Logical errors in the automation script may cause errors, such as unexpected or undesirable results and/or a failure to resolve an error indicated by the operating system messages. By simulating operating systems messages and executing an automation script to determine the result obtained by the automation script, logical or syntactical errors in the automation script may be identified prior to operation of the automation script in a production system. Thus, errors and downtime caused by incorrect automation scripts may be identified during simulation.

According to one embodiment, a method may include receiving an automation script comprising a plurality of automation rules, wherein the automation script includes at least one automation rule referencing an original operating system message from an original set of operating system messages; receiving a listing of changed operating system messages, wherein at least one entry of the listing of changed operating system messages identifies a change to an original operating system message of the set of original operating system messages; parsing the automation script to identify automation rules referencing an original operating system message of the set of original operating system messages; and generating a report listing the identified automation rules of the automation script that reference an original operating system message of the set of original operating system message.

According to another embodiment, a computer program product may include a non-transitory computer readable medium comprising code to perform the steps of receiving an automation script comprising a plurality of automation rules, wherein the automation script includes at least one automation rule referencing an original operating system message from an original set of operating system messages; receiving a listing of changed operating system messages, wherein at least one entry of the listing of changed operating system messages identifies a change to an original operating system message of the set of original operating system messages; parsing the automation script to identify automation rules referencing an original operating system message of the set of original operating system messages; and generating a report listing the identified automation rules of the automation script that reference an original operating system message of the set of original operating system message.

According to a further embodiment, an apparatus may include a processor coupled to a memory. The processor may be configured to perform the steps of receiving an automation script comprising a plurality of automation rules, wherein the automation script includes at least one automation rule referencing an original operating system message from an original set of operating system messages; receiving a listing of changed operating system messages, wherein at least one entry of the listing of changed operating system messages identifies a change to an original operating system message of the set of original operating system messages; parsing the automation script to identify automation rules referencing an original operating system message of the set of original operating system messages; and generating a report listing the identified automation rules of the automation script that reference an original operating system message of the set of original operating system message.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
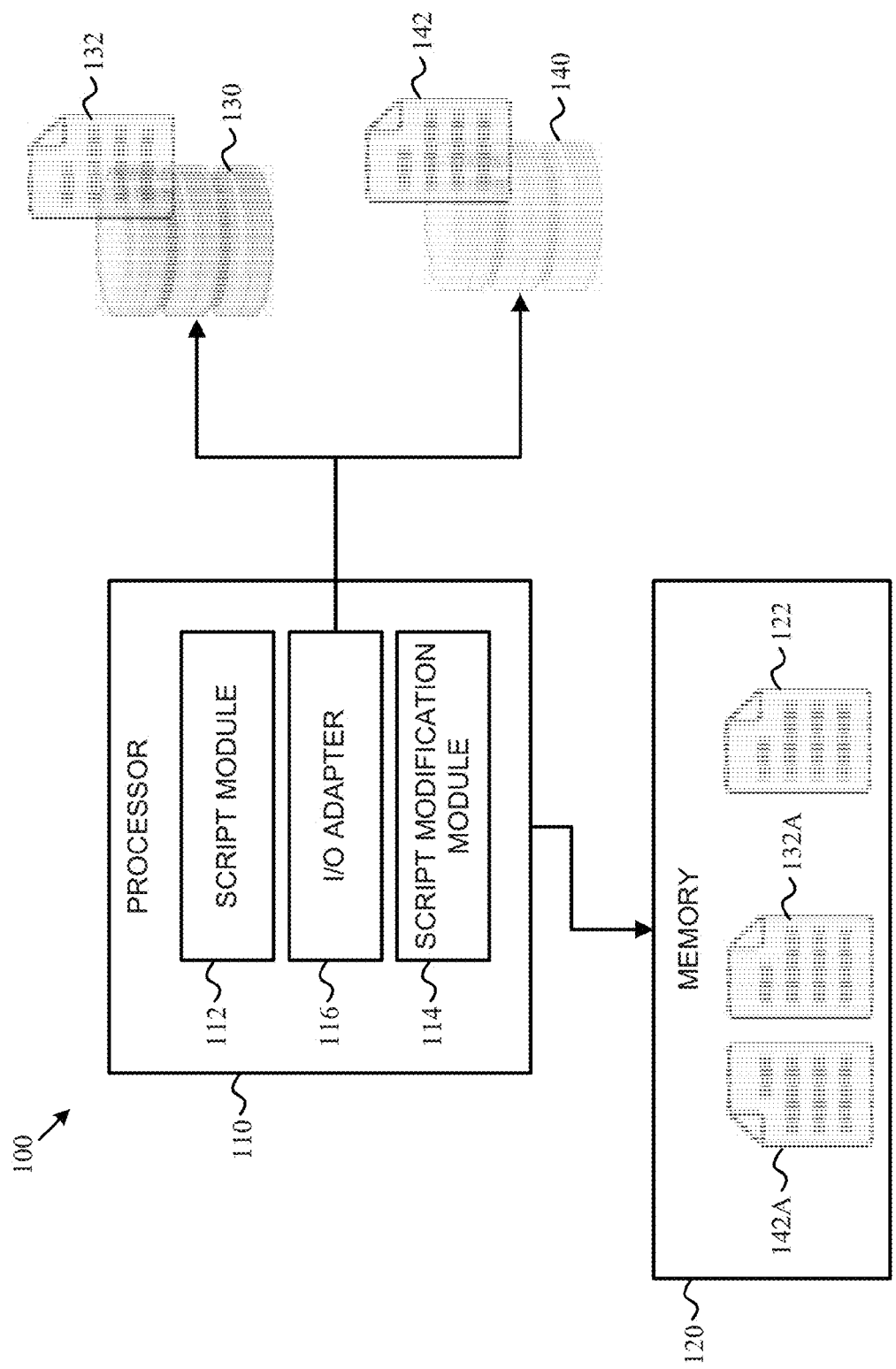
FIG. 1 is a block diagram illustrating examination of automation scripts to match changes in operating system messages referenced by the automation script according to one embodiment of the disclosure.

FIG. 1 is a block diagram illustrating examination of automation scripts to match changes in operating system messages referenced by the automation script according to one embodiment of the disclosure. A processor 110 may include a script module 112. The script module 112 may be, for example, a specific hardware circuit within the processor 110 configured to perform specific tasks, such as in an application specific integrated circuit (ASIC). The script module 112 may alternatively be, for example, a general execution unit within the processor 110, such as within a general-purpose central processing unit (CPU), configured by a software program product to perform specific tasks.

The processor 110 may be coupled to memory 120 configured to store information, such as automation rules and/or scripts, for processing by the script module 112. The processor 110 may also be coupled to storage devices 130 and/or 140 through an input/output (I/O) adapter 116 for accessing data, including an automation script 132 and a list 142 of changes to operating system messages. The processor 110 may load the list 142 and the script 132 into memory 120 as list 142A and script 132A for examination by the script module 112.

The script module 112 may parse the script 132A to identify a reference to an operating system message matching an entry in the list 142A of changes to the operating system messages. A list 122 of matching entries may be assembled by the script module 112 and stored in memory 120. The list 122 of matching entries may be reported to an administrator, such as through an email message. The list 122 of matching entries may also be further processed by script modification module 114. The script modification module 114 may modify automation script 132 based on the matched references in list 122 of matching entries. The modification performed by script modification module 114 may include, for example, altering references in the automation script 132 to match new operating system messages in list 142. The modification module 114 may also perform other modifications as described in further detail below.

The processor 110 may be, for example, part of a server, such as a UNISYS Operations Sentinel server, that provides an automation language that matches system console messages and takes actions based on variable states. The processor 110 may be driven by programmed conditional logic, which can facilitate the automation of system operations. In one embodiment, the automation language may be the Autoaction Message System (AMS), which matches system console messages to trigger actions that would previously have been entered manually by administrators. Generally, a message-based system may be dependent on the defined system console messages remaining fixed. However, these system console messages may be altered, removed, or added during updating of the server's operating system.

The processor 110 may alert administrators of the automation scripts that previously-defined messages have been added, removed, or changed, and/or suggest modifications to fix the automation scripts. In some embodiments, these changes may be implemented automatically, such as when the changes are approved by an administrator through a button click. In some embodiments, modifications to the automations script may be suggested and/or implemented based on industry best practices. For example, in the AMS language some administrators may use the AMS DELIM-ITERs command syntax, when a more efficient approach may be implemented with sub-tokenization and/or CON-STRAINT command syntax.

Figure 2:
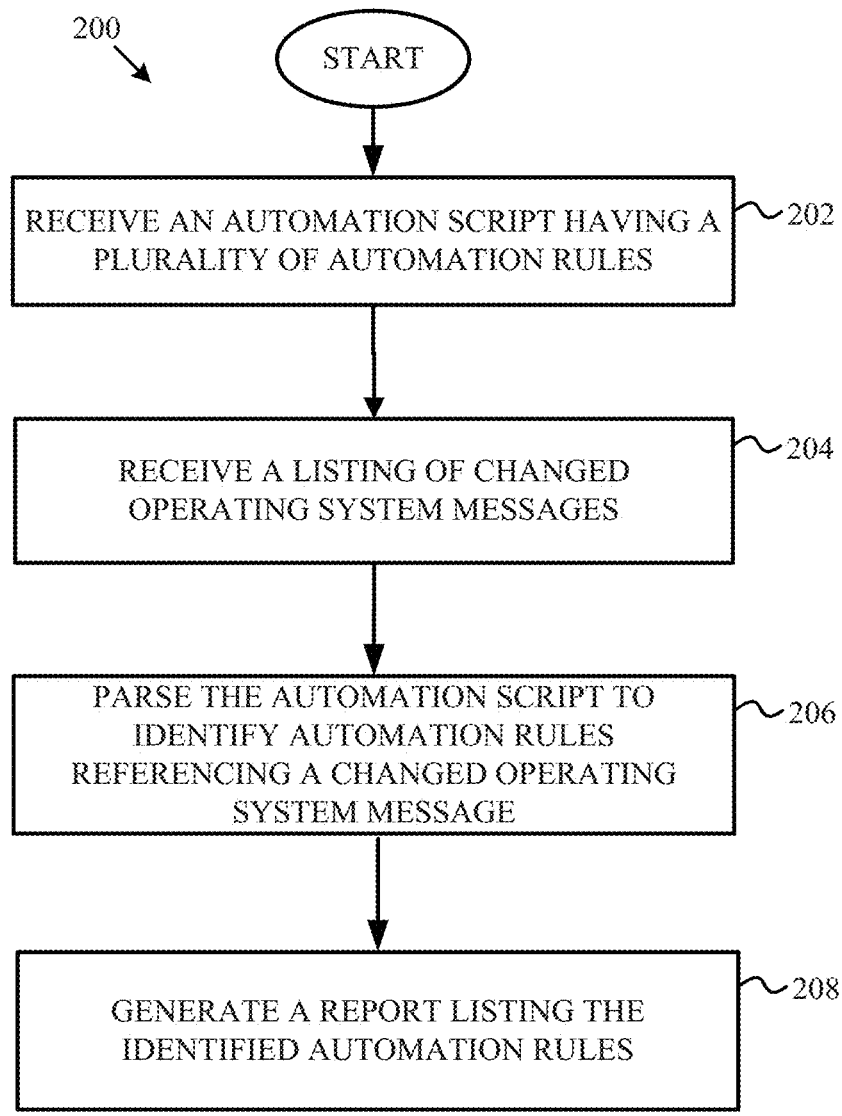
FIG. 2 is a flow chart illustrating a method for examining automation scripts to identify changes in operating system messages referenced by the automation script according to one embodiment of the disclosure.

FIG. 2 is a flow chart illustrating a method for examining automation scripts to identify changes in operating system messages referenced by the automation script according to one embodiment of the disclosure. A method 200 may begin at block 202 with receiving an automation script comprising a plurality of automation rules, wherein the automation script includes at least one automation rule referencing an original operating system message from an original set of operating system messages.

At block 204, the method 200 may continue with receiving a listing of changed operating system messages, wherein at least one entry of the listing of changed operating system messages identifies a change to an original operating system message of the set of original operating system messages.

The listing received at block 204 may include entries of new, changed, and/or deleted operating system messages. Example definitions for the listing include: NEW "Example of a new console message;" CHG "Example of the original console message" "Example of the changed console message;" and DEL "Example of a deleted console message." The listings may be provided by an engineering group that is responsible for development of the operating system.

At block 206, the method 200 may continue with parsing the automation script to identify automation rules referencing an original operating system message of the set of original operating system messages. Parsing may be performed by an automation code parser that examines the automation script received at block 202 and compares a set of new/changed/deleted operating system messages received at block 204 to lines of the automation script. The automation code parser may identify rules within the automation script that will no longer function when the operating system that implements the changed messages is installed.

In some embodiments, the automation script may also identify other potential errors within the automation script. For example, errors may be present in the automation rules, even though the rules are syntactically correct and executable. In another example, rules executing with low efficiency may be identified and presented along with suggested modifications. In yet another example, rules may be compared to best practices to identify suggestions for improving compliance of an automation script with a best practices manual. In a further example, the automation code parser may identify issues with code readability and maintainability. For example, the code parser may convert all syntax to upper case, except for variables which may be mixed case. Further, indentation of the code may be added for nested if statements and long statements may be split over multiple lines with continuation characters (e.g., "\").

Block 206 may proceed through a message list of block 204 and scan the automation script from block 202 by comparing each line of the message list with each line of the automation script. While parsing the automation script file, the following actions may be taken for each category of message being modified.

If a new operating system message exactly matches an existing rule of an automation script a false match may be identified. A match between the messages may mean that the tokens specified as fixed, keyword, masked, in the CON-STRAINT command, etc., will match the new message. The administrator may be warned that specific rule(s) will match a console message that did not previously exist, and that this is likely to cause unexpected results.

If an original operating system message matches a line of the automation script, further analysis may be performed to determine whether the change will affect the automation script. If no affect is expected then a warning message may indicate that the message has changed, but that it appears to still match. The warning may allow an administrator to perform a more exhaustive analysis to determine if non-matching tokens (or sub-tokens) will still function as expected. There may also be added value inherent in the changed message tokens that should be investigated by the user. For instance, a count of event occurrences, additional detail, or indications of severity contained in the changed message could be leveraged by enhanced AMS code. If the original message was found to match existing AMS code but the changed message will not match, an error may be presented to the administrator.

If a deleted original operating system message matches an existing rule then an error message may inform the administrator of the change. In some embodiments, the removal of a message may not impact the overall operating environment, and the effort becomes one of AMS rule maintenance. When a rules database can include a limited number of rules, determining that a particular rule may be removed may be valuable and may allow the administrator to manage the database more effectively.

At block 208, the method 200 may continue with generating a report listing the identified automation rules of the automation script that reference an original operating system message of the set of original operating system message. In one embodiment, the report may include suggested fixes to the automation script. These changes may be automatically implemented when approved by an administrator.

In one embodiment, a simulator may be provided as part of the automation code parser through which message traffic may be replayed. The simulator may replicate complex automation scenarios in a virtual system environment before the automation script is implemented on an actual production system. In one embodiment, the original automation script may be modified based on changes to the operating system messages, and the modified automation script executed in the simulator before the modified automation script is placed in a production environment.

Figure 3:
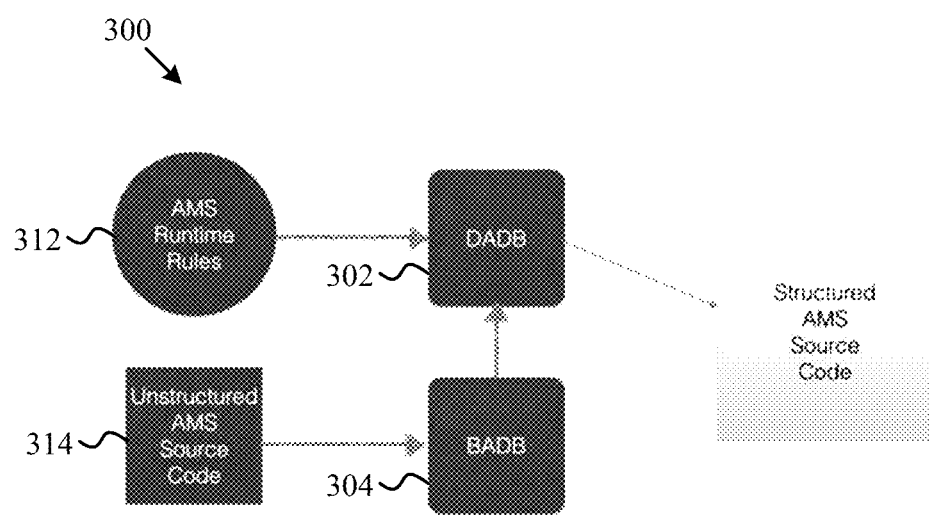
FIG. 3 is a block diagram illustrating a system for preparing automation scripts for examination according to one embodiment of the disclosure.

The process for analyzing automation script may also include pre and/or post-processing of the automation script. FIG. 3 is a block diagram illustrating a system for preparing automation scripts for examination according to one embodiment of the disclosure. The system 300 may include a dump database 302 (e.g., DADB), build database 304 (e.g., BADB), and a verify database (e.g., VADB) (not shown). The DADB 302 and BADB 304 may format an automation script for processing as structured source code for the automation script parser that is described above. The DADB 302 may decompile automation source code from the machine-readable copy 312 used by a server runtime to match console messages to automation rules. The DADB 302 may be invoked with formatting options to structure the code by known, reliable rules. When the automation rules are provided to the parser as actual source code 314, the BADB 304 may first build the raw source code and then decompile the results in a structured fashion with DADB 302. The output of the DADB 302 may be formatted and structured source code that may be analyzed programmatically by the automation script parser.

Without the automation script parser described above, manual and time-consuming analysis was the only means to expose issues, which was unlikely to occur except at only the most committed data centers. The parser automates the analysis of automation code and thus improves system reliability. Further, the automatic parser may provide additional freedom to operating system development teams to change operating system messages as needed or desired, with less fear that an existing automation script will be affected. Likewise, the automatic parser may allow an administrator to be more comfortable with the development of automation scripts. Thus, the administrator may expand the use of automation scripts, making the management of their datacenter more efficient and reducing management costs.

Figure 4:
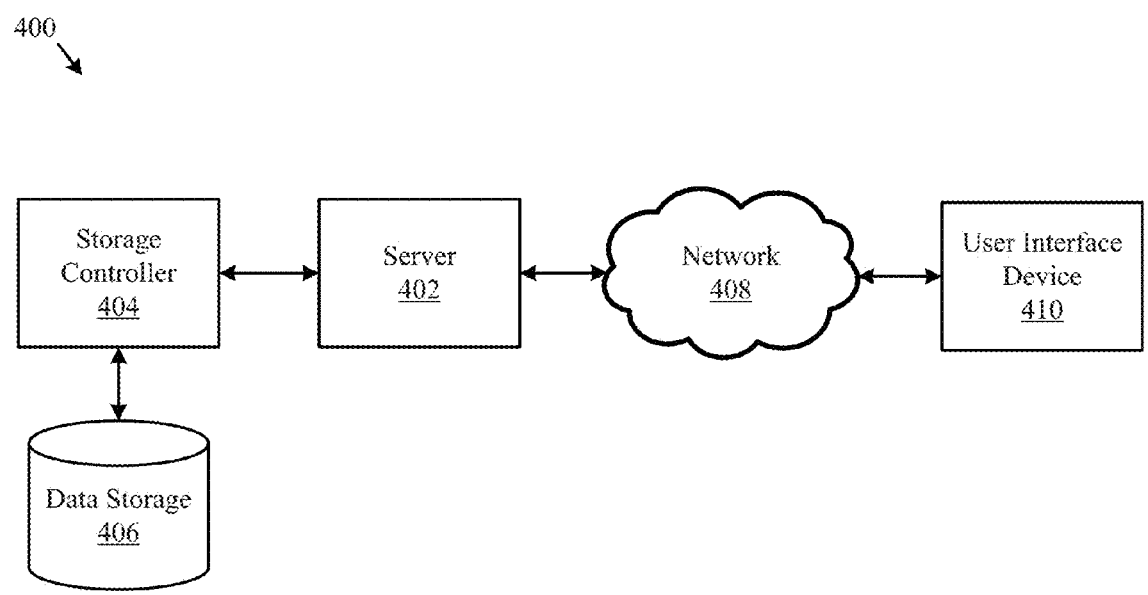
FIG. 4 is a block diagram illustrating a computer network according to one embodiment of the disclosure.

FIG. 4 illustrates one embodiment of a system 400 for an information system, including a system for determining levels of compliance. The system 400 may include a server 402, a data storage device 406, a network 408, and a user interface device 410. In a further embodiment, the system 400 may include a storage controller 404, or storage server configured to manage data communications between the data storage device 406 and the server 402 or other components in communication with the network 408. In an alternative embodiment, the storage controller 404 may be coupled to the network 408.

In one embodiment, the user interface device 410 is referred to broadly and is intended to encompass a suitable processor-based device such as a desktop computer, a laptop computer, a personal digital assistant (PDA) or tablet computer, a smartphone, or other mobile communication device having access to the network 408. In a further embodiment, the user interface device 410 may access the Internet or other wide area or local area network to access a web application or web service hosted by the server 402 and may provide a user interface for receiving information for determining compliance with various principles.

The network 408 may facilitate communications of data between the server 402 and the user interface device 410. The network 408 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 5:
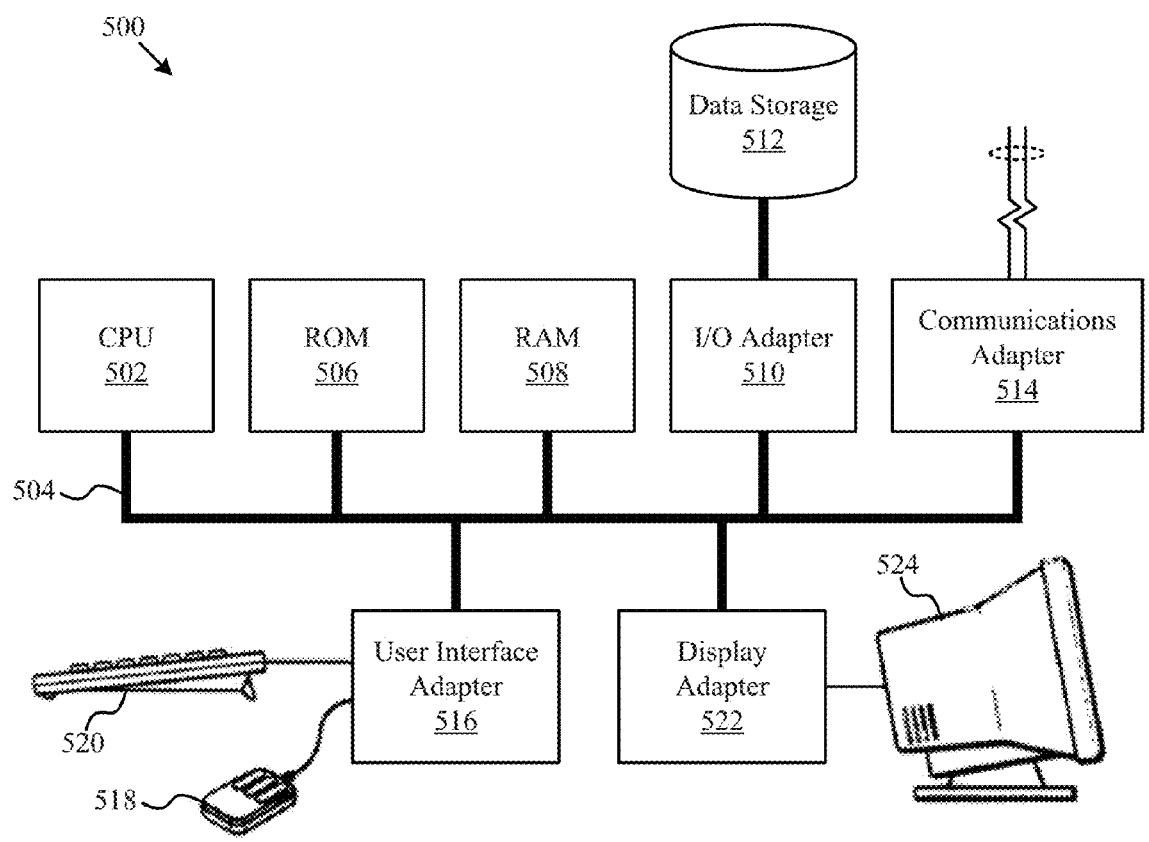
FIG. 5 is a block diagram illustrating a computer system according to one embodiment of the disclosure.

FIG. 5 illustrates a computer system 500 adapted according to certain embodiments of the server 402 and/or the user interface device 410. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computer system 500 may also include random access memory (RAM) 508, which may be synchronous RAM (SRAM), dynamic RAM (DRAM), synchronous dynamic RAM (SDRAM), or the like. The computer system 500 may utilize RAM 508 to store the various data structures used by a software application. The computer system 500 may also include read only memory (ROM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computer system 500 may also include an input/output (I/O) adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface (GUI) associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computer system 500. According to one embodiment, the data storage 512 may be a separate server coupled to the computer system 500 through a network connection to the I/O adapter 510. The communications adapter 514 may be adapted to couple the computer system 500 to the network 408, which may be one or more of a LAN, WAN, and/or the Internet. The user interface adapter 516 couples user input devices, such as a keyboard 520, a pointing device 518, and/or a touch screen (not shown) to the computer system 500. The keyboard 520 may be an on-screen keyboard displayed on a touch panel. The display adapter 522 may be driven by the CPU 502 to control the display on the display device 524. Any of the devices 502-522 may be physical and/or logical.

The applications of the present disclosure are not limited to the architecture of computer system 500. Rather the computer system 500 is provided as an example of one type of computing device that may be adapted to perform the functions of the server 402 and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 500 may be virtualized for access by multiple users and/or applications.

If implemented in firmware and/or software, the functions described above, such as described with reference to FIG. 2, may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, computer implemented method for providing an automated code parser to review automation scripts within a programmable processing system, the programmable processing system having a processor, memory, mass storage device, a user interface, the method comprising:
   receiving an automation script comprising a plurality of automation rules, wherein the automation script includes at least one automation rule referencing an original operating system message from an original set of operating system messages;
   receiving a listing of changed operating system messages, wherein at least one entry of the listing of changed operating system messages identifies a change to the original operating system message of the set of original operating system messages;
   parsing the automation script to identify automation rules referencing an original operating system message of the set of original operating system messages; and
   generating a report listing the identified automation rules of the automation script that reference the original operating system message of the set of original operating system messages to be provided to a user via the user interface.

2. The method of claim 1, further comprising modifying the automation script based, at least in part, on the generated report.

3. The method of claim 1, wherein the automation script is structured source code, the method further comprising:
   receiving an unstructured source code;
   building the unstructured source code into compiled source code; and
   decompiling the compiled source code to the structured source code.

4. The method of claim 1, wherein the automation script is structured source code, the method further comprising:
   receiving compiled source code; and
   decompiling the compiled source code to the structured source code.

5. The method of claim 1, further comprising:
   simulating a plurality of operating system messages; and
   executing the automation script against the plurality of simulated operating system messages.

6. The method of claim 1, further comprising modifying syntax of the automation script to improve compliance with a best practices.

7. The method of claim 1, wherein the step of receiving the automation script comprises receiving an autoaction message system (AMS) script.

8. A computer program product containing encoded data stored in a non-transient media for providing an automated code parser to review automation scripts within a programmable system, the programmable processing system having a processor, memory, mass storage device, and a user interface, the computer program product comprising:
   a non-transitory computer readable medium comprising code, when executed by one or more processors, to perform the steps comprising:
      receiving an automation script comprising a plurality of automation rules, wherein the automation script includes at least one automation rule referencing an original operating system message from an original set of operating system messages;
      receiving a listing of changed operating system messages, wherein at least one entry of the listing of changed operating system messages identifies a change to the original operating system message of the set of original operating system messages;
      parsing the automation script to identify automation rules referencing the original operating system message of the set of original operating system messages; and
      generating a report listing the identified automation rules of the automation script that reference the original operating system message of the set of original operating system messages to be provided to a user via the user interface.

9. The computer program product of claim 8, wherein the medium further comprises code to perform the step of modifying the automation script based, at least in part, on the generated report.

10. The computer program product of claim 8, wherein the automation script is structured source code, the medium further comprises code to perform the steps comprising:
    receiving an unstructured source code;
    building the unstructured source code into compiled source code; and
    decompiling the compiled source code to the structured source code.

11. The computer program product of claim 8, wherein the automation script is structured source code, the medium further comprising code to perform the steps comprising:
    receiving compiled source code; and
    decompiling the compiled source code to the structured source code.

12. The computer program product of claim 8, wherein the medium further comprises code to perform the steps comprising:
    simulating a plurality of operating system messages; and
    executing the automation script against the plurality of simulated operating system messages.

13. The computer program product of claim 8, wherein the medium further comprises code to perform the step of modifying syntax of the automation script to improve compliance with a best practices.

14. An apparatus for providing an automated code parser to review automation scripts within a programmable processing system, the programmable processing system having a processor; memory, mass storage device; a user interface, comprising:

the memory; and the processor coupled to the memory, wherein the processor is configured to perform the steps comprising:

receiving an automation script comprising a plurality of automation rules, wherein the automation script includes at least one automation rule referencing an original operating system message from an original set of operating system messages;

receiving a listing of changed operating system messages, wherein at least one entry of the listing of changed operating system messages identifies a change to the original operating system message of the set of original operating system messages;

parsing the automation script to identify automation rules referencing the original operating system message of the set of original operating system messages; and generating a report listing the identified automation rules of the automation script that reference the original operating system message of the set of original operating system messages to be provided to a user via the user interface.

15. The apparatus of claim 14, wherein the processor is further configured to perform the step of modifying the automation script based, at least in part, on the generated report.

16. The apparatus of claim 14, wherein the automation script is structured source code, and wherein the processor is further configured to perform the steps comprising:

receiving an unstructured source code;

building the unstructured source code into compiled source code; and decompiling the compiled source code to the structured source code.

17. The apparatus of claim 14, wherein the automation script is structured source code, and wherein the processor is further configured to perform the steps comprising:

receiving compiled source code; and decompiling the compiled source code to the structured source code.

18. The apparatus of claim 14, wherein the processor is further configured to perform the steps comprising:

simulating a plurality of operating system messages; and executing the automation script against the plurality of simulated operating system messages.

19. The apparatus of claim 14, wherein the processor is further configured to perform the step of modifying syntax of the automation script to improve compliance with a best practices.

\* \* \* \* \*